United States Patent [19] [11] 4,357,788
Amberg [45] Nov. 9, 1982

[54] METHOD AND APPARATUS FOR ASSEMBLING TUBULAR SLEEVE PREFORMS AND CONTAINERS

[75] Inventor: Stephen W. Amberg, Toledo, Ohio
[73] Assignee: Owens-Illinois, Inc., Toledo, Ohio
[21] Appl. No.: 214,293
[22] Filed: Dec. 8, 1980

Related U.S. Application Data

[63] Continuation of Ser. No. 19,027, Mar. 9, 1979, abandoned.

[51] Int. Cl.³ .............................................. B65B 7/28
[52] U.S. Cl. ........................................ 53/585; 53/292
[58] Field of Search .................. 53/399, 291, 292, 295, 53/585; 270/11; 156/86, 423

[56] References Cited

U.S. PATENT DOCUMENTS

| | | | |
|---|---|---|---|
| 1,598,392 | 8/1926 | Risser | 53/331.5 |
| 1,889,958 | 12/1932 | Frech | 53/206 X |
| 1,962,481 | 6/1934 | Clark | 53/292 X |
| 2,644,628 | 7/1953 | Gunter | 53/292 |
| 2,654,520 | 10/1953 | Allen | 53/292 |
| 2,732,115 | 1/1956 | Allen | 53/292 |
| 2,751,735 | 6/1956 | Bartlett | 53/292 |
| 2,815,629 | 12/1957 | Eddison | 53/292 |
| 2,826,022 | 3/1958 | Price | 53/292 |
| 3,394,930 | 7/1968 | Guggisberg | 271/11 |
| 3,659,838 | 5/1972 | Davis | 271/11 |
| 3,852,940 | 12/1974 | Kinoshita | 53/292 |
| 3,861,118 | 1/1975 | Muto | 53/292 X |
| 3,968,623 | 7/1976 | Langen | 53/575 |

Primary Examiner—John Sipos
Attorney, Agent, or Firm—D. T. Innis; Myron E. Click; David H. Wilson

[57] ABSTRACT

This invention relates to method and apparatus for producing a composite container having a body label or tubular sleeve mounted temporarily thereon adapted to be shrunken into final surface covering position. The tubular sleeve is preformed of thin flexible plastic material and flat-folded until ready for use when it is fully opened and arcuately conveyed in axial registry with a container therebeneath. The sleeve preform of heat-shrinkable plastic material is telescopically assembled onto the container while the latter is conveyed through a coincidental arcuate path. The container preferably consists of a one or two-component lightweight hollow plastic container with the tubular preform made slightly larger in diameter to surround a body portion of the container. The tubular sleeve preform is engaged and fully opened by a juxtaposed pair of vacuum heads which are pivotally partible and arcuately conveyed by such heads, and then transported downwardly in telescopic relation when in axial alignment with the container. The opened sleeve and upright container are continuously moved in synchronism in a coincident arcuate path for such sleeve mounting in temporary relation on the container body where it is adapted to subsequent heat-shrinking in place in permanent conforming arrangement.

13 Claims, 9 Drawing Figures

METHOD AND APPARATUS FOR ASSEMBLING TUBULAR SLEEVE PREFORMS AND CONTAINERS

This is a continuation, of application Ser. No. 019,027 filed Mar. 9, 1979, now abandoned.

BACKGROUND OF THE INVENTION

1. Field of the Invention

This invention relates to the manufacture of containers and primarily to the preliminary assembly of a hollow sleeve preform onto an upper extremity of a container for subsequent shrinking in situ thereon. The preform is taken in stored, flattened condition to a position immediately above the container where it is fully opened by a pair of vacuum heads and then moved into co-axial alignment with the container. The vacuum heads are pivotally partible to fully open the tubular preform and adapted to arcuate movement to co-axially align the two components for their telescopic assembly. After such initial assembly with the tubular preform no longer retained, the preform is finally deposited on the container body in precise vertical alignment. The final shrinking of the preform tightly around the container body, as can be performed by many appropriate physical conditions, is not part of this invention.

2. Description of Prior Art

This invention comprises an improvement over the methods and apparatus disclosed in issued U.S. Pat. No. 3,767,496, issued Oct. 23, 1973; U.S. Pat. No. 3,802,942 issued Apr. 9, 1974; and U.S. Pat. No. 3,959,065 issued May 25, 1976, all of which are commonly owned with the present application. In each of these disclosures, a tubular sleeve is formed which is telescopically assembled onto the article from below by a push-up mechanism. None of these disclosures pertain to a thin flexible sleeve of thermoplastic material which is stored in flattened, prefabricated condition and then opened and telescoped over the container in rapid and efficient assembly during their coincident arcuate movement.

In many of the previously-disclosed processes and apparatus for making composite containers having an integral plastic base or sleeve thereon, a manufactured glass bottle or jar is loaded onto a conveyor and preheated prior to mounting the plastic sleeve. The plastic sleeves are carried on an underlying turret to pass into alignment with the bottles and are moved vertically upwardly into telescopic assembly over the lower ends of the bottles. The sleeves are then carried on the bottles into a heating apparatus such as a tunnel oven wherein appropriate physical conditions shrink the sleeves into close-fitting conforming arrangement over the bottle surfaces where assembled. The heating apparatus commonly consists of a lengthwise oven through which the bottles are passed, the oven temperatures ranging from about 170° F. to 800° F., depending upon the plastic material selected to comprise the sleeves. U.S. Pat. No. 3,959,065, owned by the common assignee of this application, discloses method and apparatus which assure against dislocation of the sleeve on the bottle without external handling mechanism being required to hold the sleeve in place between its assembly point with the bottle and the shrinking oven.

The cap sealing of bottles has been conventionally performed in recent years to provide for reasons of sanitation, pilfer-proofing, safety and appearance, the further step of placing over and around the neck of the bottle, as well as preferably over at least part of its closure, a tubular sleeve of heat-contracting synthetic resin material, severed to a prescribed length, and then sealing the sleeve to the bottle by thermal contraction. The synthetic resin tubing is usually pressed flat and delivered in rolls in many production processes, and since the tubing may or may not stay fully flattened, particularly where it is comprised of extremely flexible and resilient material, inefficiencies can and do result when the severed lengths of tubing are fitted onto the bottle necks. In some cases, to facilitate the fitting of short, flat, tubular sleeves onto the necks of bottles, it has been common practice to preform the sleeves such as by putting perforations or scores along their fold lines. It is also possible to apply the tubes around the bottle necks without preforming the material, as taught by U.S. Pat. No. 3,861,118 to Muto; however, such method normally requires the application of a bonding agent to the bottle neck for firm adherence of the sleeve. The method and apparatus disclosed by this patent are exceedingly more complex and prone to occasionally misapply a tubular band or label. U.S. Pat. No. 2,852,899 to Murrell discloses a collar feeding mechanism which is designed to remove only the lowermost collar from a nested stack by frictional engagement with its inner surface. The collars are preformed and nested tightly into a stack from which they are deliverable onto the container necks.

SUMMARY OF THE INVENTION

An object of this invention is to provide method and apparatus for positively opening flat-formed, tubular, blank sleeves of thin flexible material and placing the same telescopically over the top of the containers while both are arcuately conveyed in axial alignment. The sleeves are preferably comprised of thin film thermoplastic material and the containers of lightweight one or two-component thermoplastic materials having different physical characteristics.

The present invention is disclosed hereinafter in a specific preferred embodiment, provides both method and apparatus for applying a preformed, extremely-flexible thin tubular band or sleeve to a major body portion of a container where it is frictionally retained prior to subsequent heat shrinking of the sleeve onto the container into final conforming relationship. The invention permits telescopic assembly of the band onto the container body portion in a single unitary operation. The sleeves formed of very flexible film material are stored in flat, folded condition in a stack with an open end lowermost adjacent a rotary turret adapted to engage individual sleeves serially for their full opening. A pair of partible vacuum head members having concave surfaces is adapted to retain, fully open and align an individual band prior to placing same telescopically over the upper extremity of the container by reciprocation of the vacuum head mechanism. The band is adapted to temporary retention in place on the container body portion until it is heat shrunken into conforming permanent relationship thereon.

The apparatus provides a rotary turret mechanism adapted to receive and retain a flattened, flexible preformed tubular, thermoplastic sleeve for its opening into container mounting configuration. A sleeve holder is arranged so that it is aligned adjacent to a portion of the arcuate path of the rotary turret. The rotary turret has a series of partible pairs of vacuum cups adapted to both retain and open the flexible flat-folded tubular sleeve and position it above the upper extremity of the container. The vacuum mechanisms mounted in spaced relation on a rotary turret permit precise axial alignment of a container body portion and sleeve so that the open sleeve is telescoped to an intermediate position on the container body.

Another feature of the invention is a vacuum pick-up device capable of radial delivery of an individual tubular preform in flattened condition from a nested stack of flattened preforms held in radial alignment to a second vacuum device for opening of the preform prior to its mounting on the upper body portion of a cylindrical container.

A further feature of the invention is the opening and downward telescopic movement of the tubular sleeve over the container body portion while the sleeve is supported by a vacuum mechanism for convenient and economical application thereof onto containers at production speed prior to heat shrinkage of the sleeve onto the surrounded circumferential body portion.

A still further feature of the present invention relates to the unique sleeve delivery mechanism adapted to uniformly and individually handle flat-folded thin extremely-flexible tubular preforms for their radial movement into vacuum opening arrangement on a rotary machine having a plurality of vacuum heads.

DESCRIPTION OF PREFERRED EMBODIMENT

Figure 1:
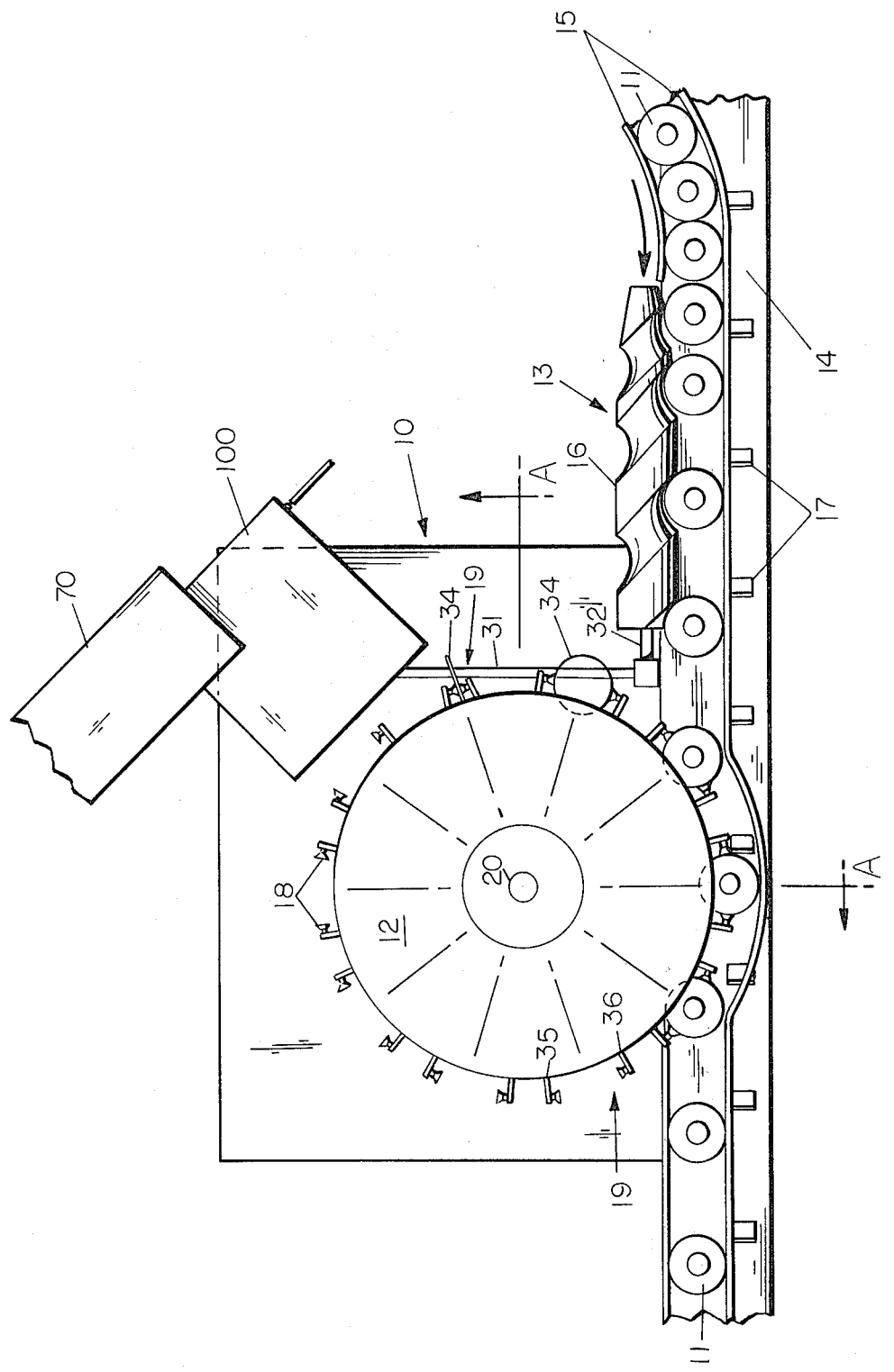
FIG. 1 is a plan view of a machine for applying plastic sleeves onto glass bottles incorporating the improvements of the present invention.

As shown in FIG. 1 of the drawings, the apparatus for producing containers with plastic sleeves thereon consists of rotary turret machine 10 which is adapted to receive and arcuately convey the sleeves around at least a portion of its full circumference while opening the same for mounting on the containers 11. The containers 11 preferably consist of rigid, hollow, glass or plastic bottles which may or may not have a closure thereon, thus being either in filled or unfilled condition, as desired.

As shown in FIG. 1, the containers 11 are delivered to the rotary turret 12 of the machine 10 serially in spaced-apart arrangement by a worm feed device 13 which is rotated in synchronism with movement of a linear conveyor 14. The conveyor 14 and worm feed device 13 are of the conventional construction adapted to conveying the containers in upright position between a pair of stationary parallel side rails 15. The worm feed 13 is designed to receive a lineal alignment of upright containers in physically-contacting, close relation and separate the same into equally-spaced separated arrangement for delivery to the rotary turret 12 of machine 10. Normally, the worm feed 13 has a continuous screw thread element 16 with a pitch distance generally complemental to the desired separated spacing of the containers for delivery to the turret machine. The axis of such thread element 16 of the worm feed extends horizontally, the thread element replacing one of the conveyor side rails 15 for a limited distance.

Thus, the containers 11 are moved apart on the upper surface of conveyor 14 by thread element 16. Conveyor 14 has a series of spaced-apart lug elements 17 in lineal alignment along one side of its conveying surface which lugs do not contact the containers during their separated spacing by thread element 16. At one region of conveyor 14 which is tangential to rotary turret 12, the pair of stationary side rails 15 are arcuately shaped to move the spaced-apart containers in an arcuate path coincidental with a minor portion of the orbital path of the turret. The containers are moved along such arcuate path by conveyor 14 as well as by lug elements 17 contacting the containers during such arcuate movement. The lugs serve to steady the containers in upright position as well as maintain them in precise position for the sleeve mounting operation.

The rotary turret 12 has a plurality of equi-spaced pairs of vacuum cups 18 mounted in equi-radial alignment extending outwardly around its circumference. The pairs of vacuum cups 18 are capable of surrounding a major body portion of the selected container to be banded. The vacuum cup pairs on the turret 12 have peripheral spacing which coincide radially so that all sleeve retention devices on the turret are equi-spaced. Each of the sleeve retention and opening devices on the turret is designated by the numeral 19.

Figure 6:
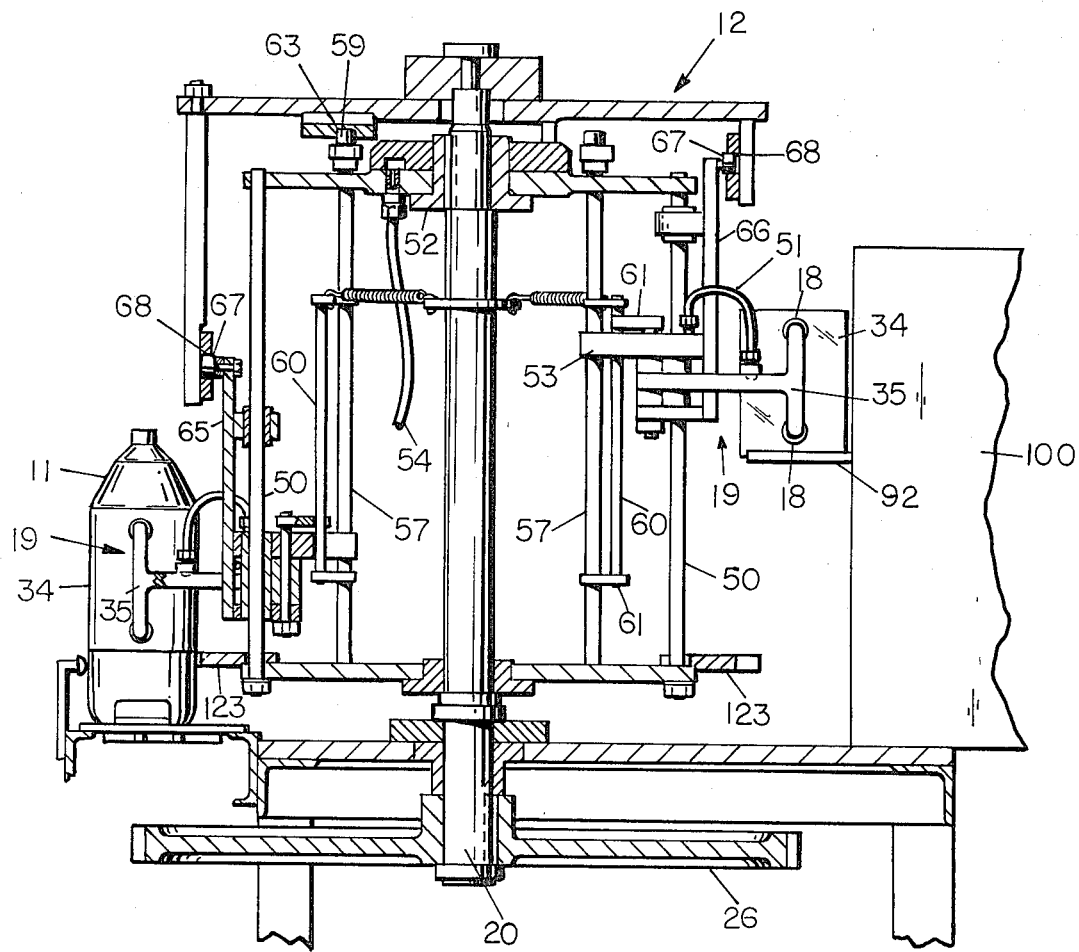
FIG. 6 is a side elevational view of the machine taken along the right-angle line A—A of FIG. 1 illustrating the rotary turret of the machine.
Figure 7:
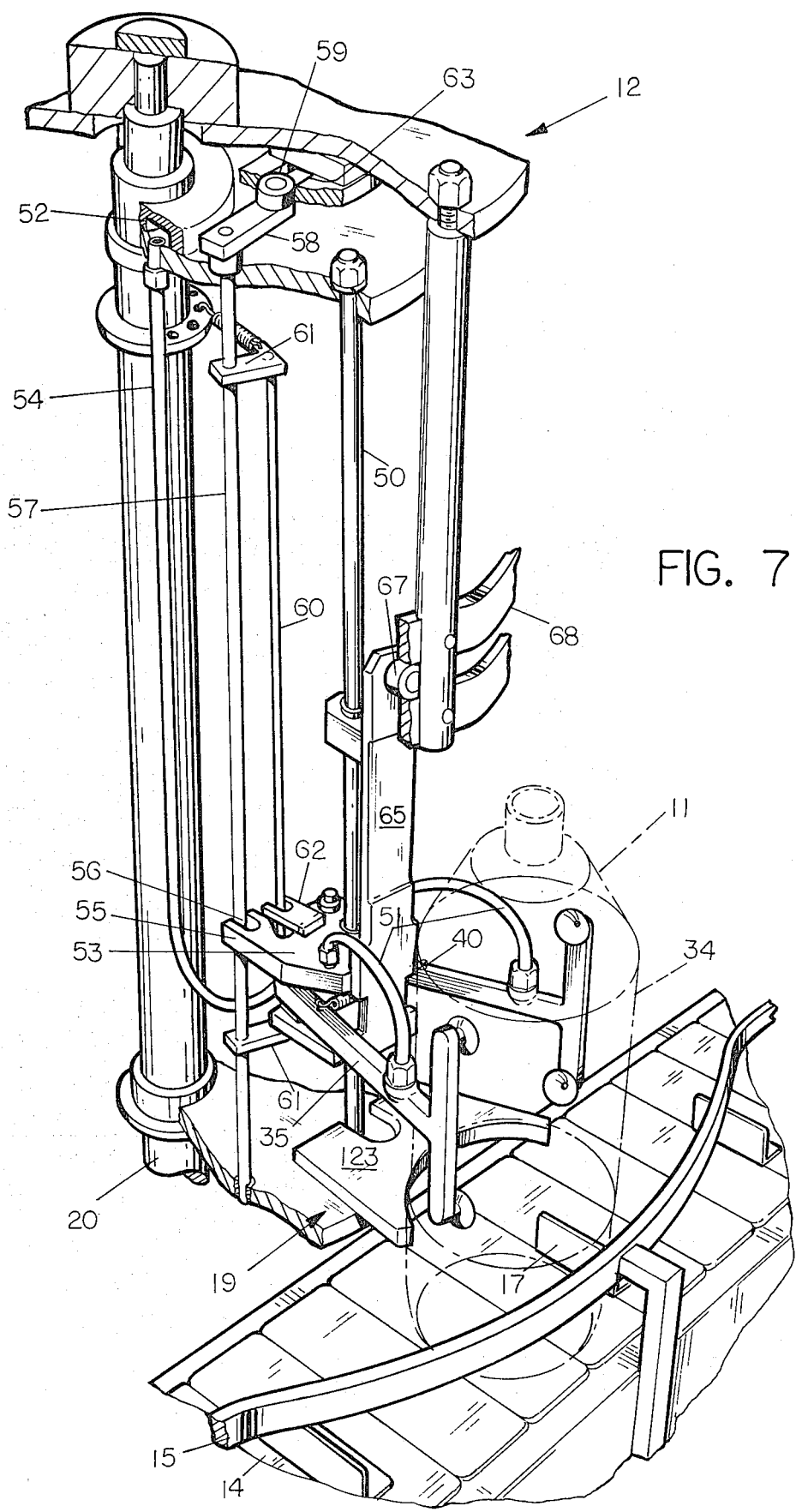
FIG. 7 is a further enlarged perspective view of one station of the rotary turret and conveying mechanism of the machine shown in FIGS. 1 and 6.

The pairs of vacuum cups are preferably comprised of an assembly of four similar cups 18 with two each mounted vertically on a single arm 35 adapted to pivotal movement toward and away from a similar opposite number on a second pivotal arm 36. Thus at each sleeve retention and opening position on the turret are located two pairs of vacuum cups 18 in vertical array facing each other in opposing relation as shown in FIGS. 1, 6 and 7. Each of the arms 35 and 36 is T-shaped with the crossleg outermost in vertical arrangement having an individual vacuum cup 18 located at its upper and lower extremities. The rearward portions of the arms 35 and 36 have projecting portions with openings therein with a central pin extending therethrough for combined arcuate movement of the arms.

Figure 2:
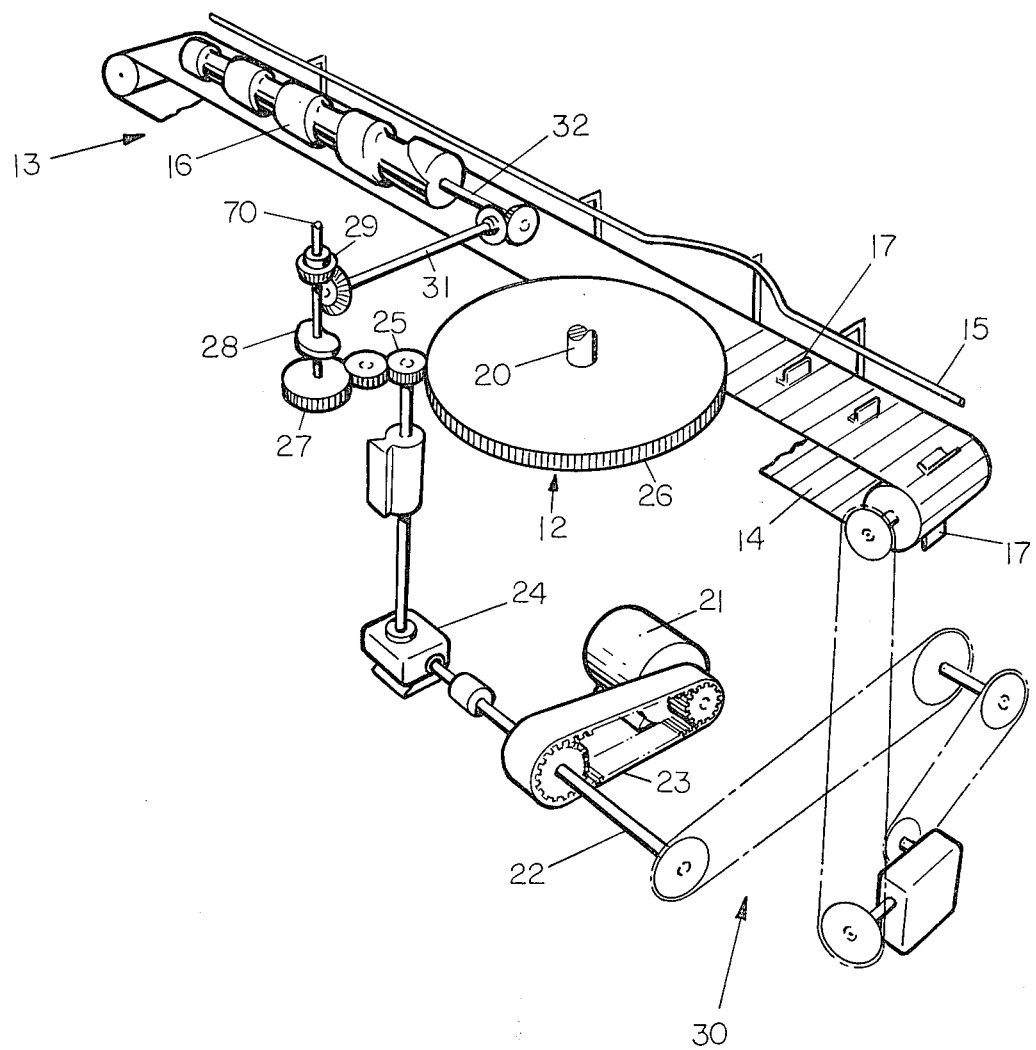
FIG. 2 is a schematic view of the power source elements of the machine shown in FIG. 1.

Rotary turret 12 is mounted on a central vertical column 20 which is continuously rotated in conjunction with movement of the conveyor 14 and worm feed device 13 as shown in FIGS. 1 and 2. Turret 12 of the machine is rotated by an electrical motor 21 which drives a horizontal shaft 22 by a cog belt 23 which in turn drives a gear box 24. A vertical shaft from gear box 24 engages a pinion gear 25 which drives vertical column 20 of turret 12 by means of a large ring gear 26 located on the turret bottom. All are located beneath the rotary turret 12 as shown in FIG. 2. The pinion gear 25 which drives turret 12 also engages an idler gear which drives another gear 27 and through a suitable vertical shaft 33 drives both the sleeve infeed mechanism as well as conveyor worm feed element 16. Shaft 33 extending from gear 27 carries a rotary main cam 28 which serves to control sleeve pick-up and delivery by the sleeve infeed mechanism. A pair of bevel gears 29 serves to drive the worm feed device 13 through shafts 31 and 32. Horizontal shaft 22 also serves to drive conveyor 14 through a series of drive chains and gears designated by the numeral 30. The referenced gears and driving mechanism which operate the various movable members of the turret and conveyor in synchronism are shown schematically in FIG. 2.

Figure 8:
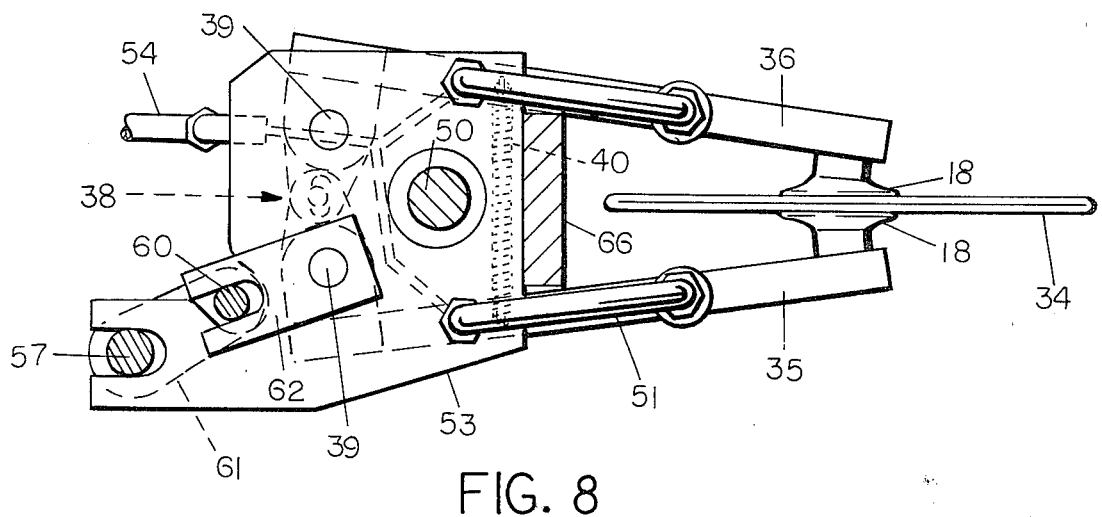
FIG. 8 is an enlarged top view of the sleeve engaging and opening mechanism shown on the righthand side of FIG. 6.
Figure 9:
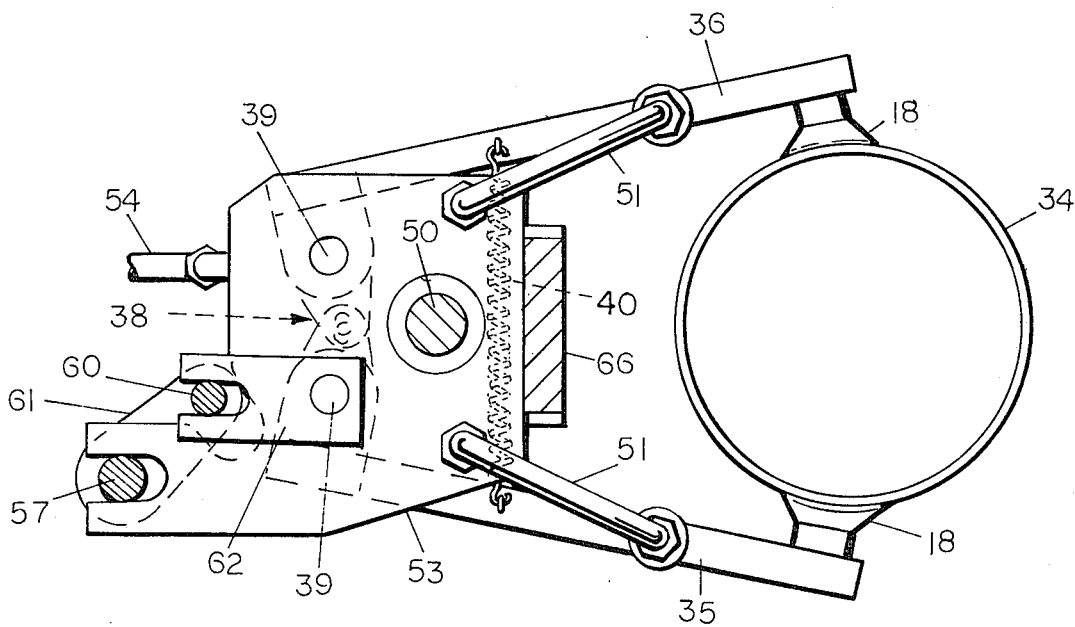
FIG. 9 is an enlarged top view of the sleeve engaging and opening mechanism shown on the lefthand side of FIG. 6.

As stated, turret 12 has a plurality of partible sleeve retaining devices 19 located around its periphery in equi-angular arrangement as shown in FIGS. 1 and 6. Each retention device 19 consists of a pair of juxtaposed, concave vacuum cups 18 which are adapted to physically contact and engage opposing surfaces of an individual sleeve 34. The vacuum cups 18 are aligned in vertical pairs at each sleeve-retention position on the rotary turret. The cups are mounted in tandem on movable arms 35 and 36 which are each pivotally mounted and adapted to move arcuately in synchronism. Each of the sleeve-retention devices 19 is thus comprised of two pairs of matching concave vacuum cups 18 which are mounted on the pivotal arms and adapted to firm engaging contact with a flattened tubular sleeve 34. The arms 35 and 36 have interconnecting ends 38 which are located intermediate their pivot points 39 to facilitate their combined arcuate movement. The arms are able to swing the vacuum cups closed to engage the flattened sleeve 34 immediately following its entry into an intermediate radial position. As shown in FIGS. 7, 8 and 9, the arm ends 38 are joined by a central pin extending through a slot in each arm between pivot points 39. A tension spring 40 is connected to each arm to maintain the arms under positive control during their opening and closing.

Each of the sleeve-retention devices 19 is mounted in vertically reciprocatable arrangement upon a vertical column 50 which is mounted in fixed relation on turret 12. Each of the arms 35 and 36 has a vacuum line 51 attached thereto which extends from a central vacuum manifold 52 on the turret into a vertically movable vacuum block 53 which comprises a portion of each sleeve retention device 19. The vacuum lines 51 extend from block 53 to hollow passages in each arm 35 and 36 and then to their respective vacuum cups 18, as shown in FIGS. 7, 8 and 9. A flexible vacuum line 54 extends from central manifold 52 to the movable vacuum block 53 of each sleeve retention device.

Movable vacuum block 53 has a rigid horizontal extension portion 55 which has a U-shaped opening 56 surrounding a rotatable vertical rod 57. Rod 57 serves as a vertical guide for extension portion 55 and its U-shaped opening 56 to maintain sleeve retention device 19 in precise radial alignment during its vertical reciprocation. Vertical rod 57 has an extension arm 58 firmly mounted on its upper end which carries a cam roller 59. A second vertical rod 60 is mounted fixedly on rod 57 by a pair of extension arm members 61 connecting its ends. A U-shaped member 62 is mounted on vacuum block 53 to be slidable on rod 60 as shown in FIG. 7. Thus, when cam roller 59 traveling in a cam track 63 turns the arm 58 on its rod 57, extension arm members 61 are swung through an arc moving rod 60. The meshed arms 35 and 36 are then simultaneously rotated through an arc to open and close the pairs of opposing cups 18.

The sleeve retention device 19 is able to be vertically moved on column or rod 50, its vertical frame member 65 being journaled on such rod in suitable bearings. The frame member 65 carries vacuum block 53 as well as an upright vertical plate 66 having a cam follower 67 located on its upper end adapted to rotation within a stationary cam track 68 extending around the upper periphery machine turret. The several cam tracks 63 and 68 are able to both open and close the vacuum cups of the device 19 as well as raise and lower the device in a prescribed cycle during its orbital movement. The fully closed and fully open positions of the vacuum cups 18 during their rotation through about a 90° quadrant of turret rotation are shown in FIGS. 8 and 9.

Figure 3:
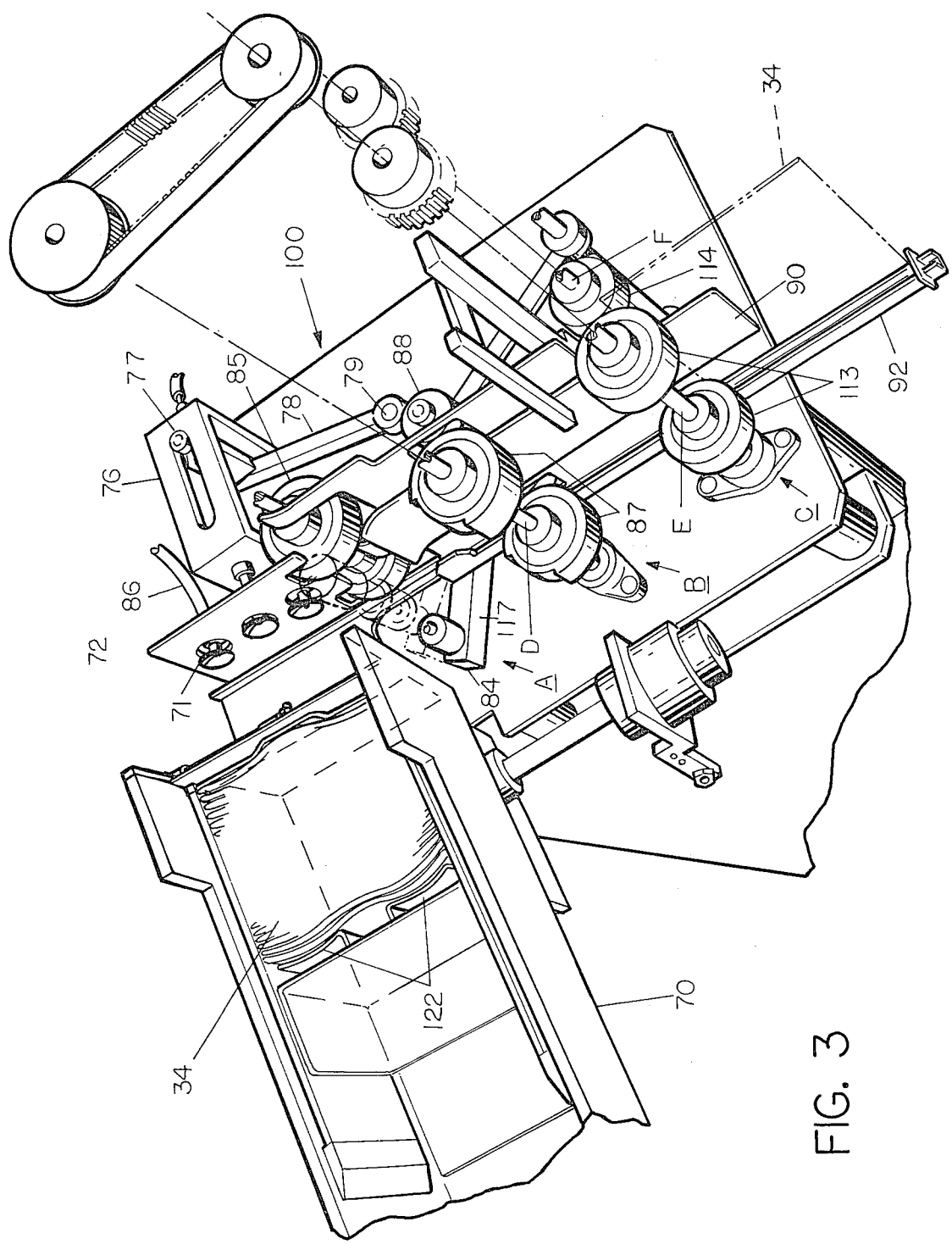
FIG. 3 is an enlarged prespective view of the sleeve infeed mechanism of the machine shown in FIG. 1 with the driving elements shown schematically.
Figure 4:
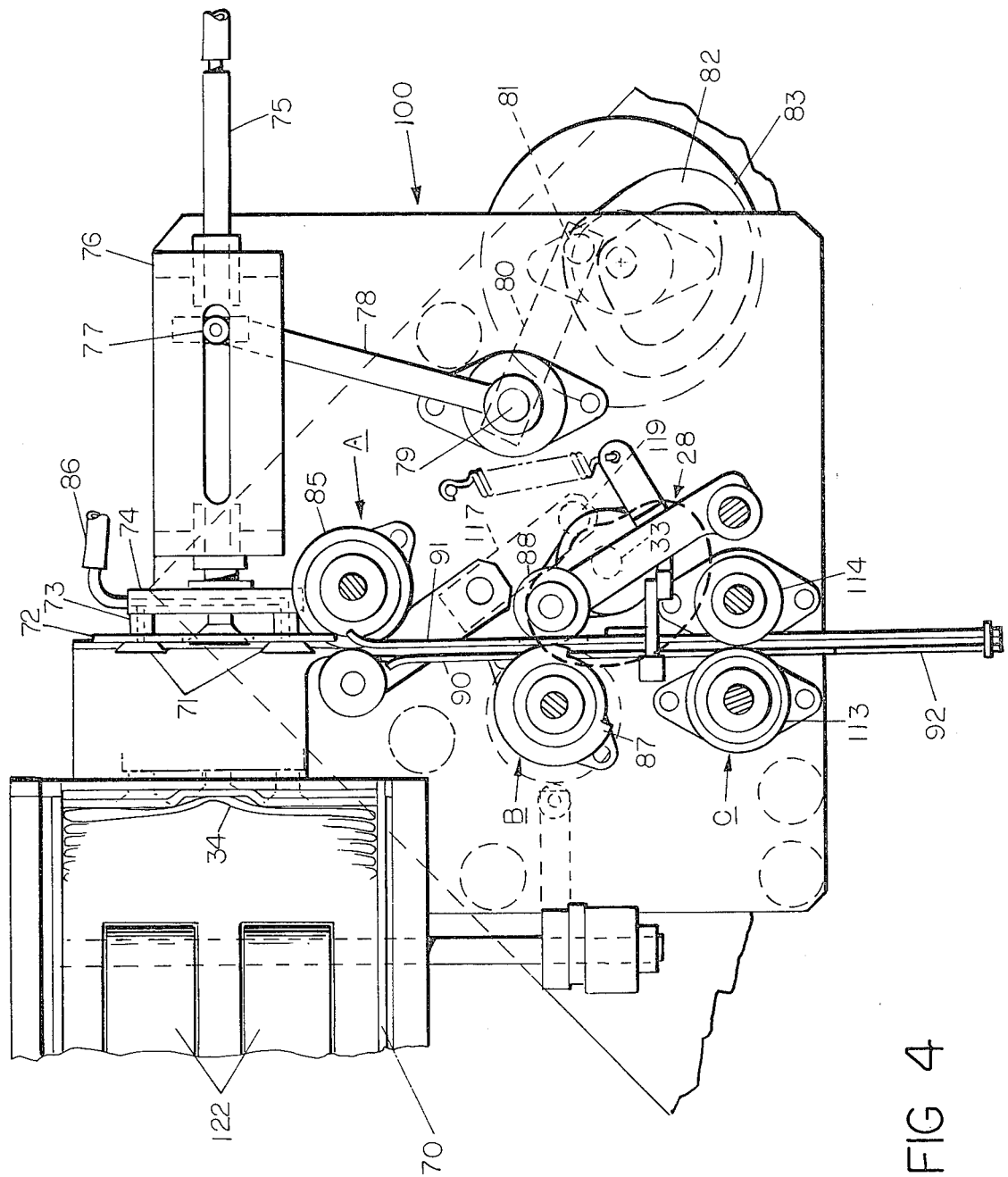
FIG. 4 is an enlarged top plan view of the sleeve infeed mechanism of the machine shown in FIG. 3 with some portions of the driving elements in broken outline.

A horizontal sleeve holder 70 is mounted closely adjacent and spaced apart from turret 12, as shown in FIGS. 1, 3 and 4. The sleeve holder 70 serves to retain a nested stack of preformed tubular sleeves 34 prior to their delivery in series to turret 12. The sleeve holder has internal dimensions closely complemental to the individual flat-folded two-ply nested stack of sleeves 34. The holder is slightly smaller at the sides of its exit area than the sleeve diameter or width dimension in flattened condition. The sleeves 34 are uniformly and tightly aligned vertically with an open end lowermost in the stack as shown in FIGS. 3 and 4. The sleeves are retained tightly enough in the holder so that a pair of second vacuum cups 71 must exert some positive pulling pressure on the outermost sleeve to pull it from the restricted exit area of the holder. In so doing, the sleeve is retained in flattened vertical condition.

The sleeves 34 are preferably comprised of a thin flexible film of thermoplastic material such as polyvinyl chloride having a wall thickness ranging from 0.001 to 0.005 inch (1 to 5 mils). The material has a preferred primary orientation extending in a circumferential direction around the preformed tubular sleeves. The preformed sleeves are extremely flexible, light-weight, and predecorated over their exterior surfaces to serve as decorated labels for containers. A lengthwise seam or fusion seal extends throughout their axial length in an area which is devoid of printing or decoration, such seam resulting from the manufacture of the sleeves from decorated roll stock. The sleeves have a diameter slightly greater than the container body portion on which they are to be placed.

The pair of sleeve pick-up cups 71 which are aligned in side-by-side relation on a vacuum head 72 are able to positively engage a medial region of a flat-facing outermost surface of a single sleeve 34 to carry the same through a limited distance into upright radial relation with machine turret 12. A vacuum line 73 extends from a central vacuum manifold 74 to each of the vacuum cups 71 mounted on head 72. Thus, negative pressure is maintained on the face of each cup 71 during operation of the machine.

Head 72 is mounted on a horizontal slide rod 75 which is operable within a slide block 76 mounted in axial and horizontal alignment with holder 70. A cam roller 77 is mounted on slide rod 75 and connected to an arm 78 which has its other end connected to a rotatable vertical shaft 79. Shaft 79 has its lower end connected to another arm 80 which carries a roller cam 81 on its opposite end. Cam 81 is movable within a cam track 82 in rotary cam 83 which is driven by a belt connecting it to shaft 79.

The pair of vacuum cups 71 is mounted in horizontally reciprocatable relation on a line radial and adjacent to turret 12. Vacuum cups 71 bring a sleeve 34 into vertical alignment with a pair of rolls 84 and 85 mounted in vertical alignment near the holder exit area. A vacuum line 86 connects with each of vacuum cups 71 through manifold 74 in order to maintain permanent vacuum on the cups during operation. Rod 75 extends the cups 71 to their fully-extended position to permit pick-up of an individual sleeve 34. An individual sleeve is thus carried a short horizontal distance while held vertically by the several cups 71 contacting the outermost surface of a single sleeve. The cups 71 are retracted by the slide rod to cause the flattened sleeve to be positively withdrawn from the holder and held stationarily upright.

Thus, each sleeve 34 is delivered in flattened condition by the vacuum cups 71 to a pair of juxtaposed rolls 84 and 85 which grasp and retain the flat sleeve as shown in FIGS. 3, 4 and 6. One roll 84 serves as a flipper roll to grasp one edge of flat sleeve 34 between an adjacent back-up roll 85 and then direct the sleeve through the pair of second stationary rolls 87 and 88 mounted on a radial line closely adjacent the machine turret. A pair of stationary guide plates 90 and 91 is located in vertical relation between the several pairs of rolls to guide the flat sleeve 34 between the rolls. The flat sleeve has its bottom edge retained in a horizontal straight hollow trough 92 which extends radially from a location beneath the pairs of pick-up vacuum cups 71 to a position beneath the orbital path of vacuum cups 18 on the turret.

Figure 5:
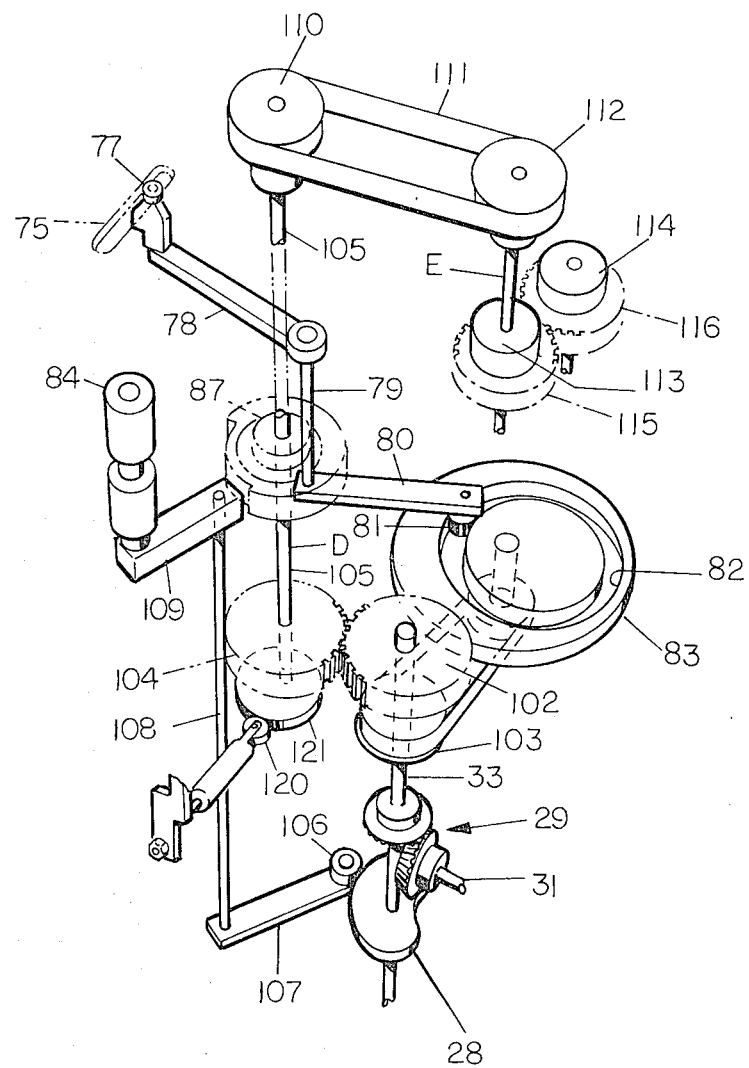
FIG. 5 is a schematic view of the driving elements for operating the sleeve infeed mechanism shown in FIGS. 3 and 4.

The several pairs of rolls 84, 85, 87 and 88 are all driven by the rotary cam 28 located beneath the sleeve feeder mechanism 100 as shown in FIGS. 2 and 4. The shaft 101 which carries cam 28 extends upwardly from bevel gears 29 having a rotary gear 102 on its upper end. An intermediate pulley 103 on shaft 101 serves to power rotary cam 83 through a suitable belt and a second pulley. Rotary gear 102 interconnects with gear 104 on shaft 105 which serves to drive the three sets of rolls designated by the letters A, B and C on FIG. 4. The contour of cam 28 is followed by a cam follower 106 mounted on a pivoted arm 107 connected to shaft 108. Shaft 108 is oscillated through an arc which oscillates a second arm 109 on which is mounted freely-rotatable flipper roll 84. Shaft 105 extends upwardly beyond roll 87 which is mounted on an intermediate region and is powered thereby. Roll 87 drives juxtaposed roll 88 by friction with and without the thin sleeve 32 therebetween. The upper portion of shaft 105 serves to drive pulley 110 and through belt 111 and a second pulley 112. Pulley 112 then powers a third pair of rolls 113 and 114 located at position C. Rolls 113 and 114 are driven in positive engagement by a set of gears 115 and 116 mounted on shafts common to rolls 113 and 114, respectively. Flipper roll 84 at position A is located on one end of a centrally pivoted arm 117 which pivots around point 118. A cam follower 119 is attached to the other end of arm 117 which follows the contour of another surface of cam 28 to oscillate flipper roll 84 into and out of the path of one end of sleeve 34. Still another cam follower 20 follows the surface of cam 121 to move the nested sleeves forwardly in holder 70 by means of a pair of spring-loaded pusher bars 122. Roll 87 has a cut-out sector portion on its working circumference to control the timing of seizing the sleeve end for its delivery through the driven pairs of rolls 87 and 88, and then through rolls 113 and 114 while aligned at its bottom. The referenced rolls are aligned in matching pairs on common shafts at both upper and lower edges of upright parallel guide plates 90 and 91. Sleeve infeed drive shaft 33 is shown between the pairs of rolls 87, 88 and 113, 114 on FIG. 4 and at the lower right-hand side of FIG. 5.

Immediately following delivery of the sleeve 34 within open vacuum cups 18, the cups are swung pivotally closed by cam track 63 to engage opposing flat surfaces of the sleeve. The fold lines of the sleeve 34 which are guided by trough 92 are then positioned radially and intermediate the two pairs of vacuum cups 18. This is shown on the right-hand side of FIG. 6. The sleeve in flat configuration is then positively grasped by the closed vacuum cup pairs engaging its upper and lower extremities. The swing dimensions of the arms carrying the pairs of vacuum cups 18 are designed to be closely complemental to the sleeve diameter to permit full opening the sleeves therewithin and subsequent vertical sliding of the sleeve downwardly onto the container body.

The sleeve is thus quickly injected into a central position between the two pivotal arms 35 and 36 and their juxtaposed pairs of vacuum cups 18 during continuous travel of turret 12 as shown in FIGS. 6 and 8. Cups 18 engage upper and lower regions of the sleeve exterior surfaces and are then moved divergently apart to fully open the sleeve during continuous arcuate travel of sleeve retention devices 19. After traveling through about one-quartile of turret circumference, the sleeve is held fully open ready for its mounting on a container body portion.

Arms 35 and 36 carrying the sleeve are then moved downwardly on rod 60 by cam track 68 to lower the sleeve into place on the container body. An arcuately-shaped guideplate 123 is mounted at a lower position on the turret 12 at each sleeve retention device 19 to bring the container into positive coaxial alignment with the open sleeve. With the arms fully open and moved above the container during its arcuate travel on conveyor 14, the sleeve 34 is telescopically mounted on the container body. The frusto-conical upper portion of the container serves to guide the sleeve into surrounding position. The container and open arms are then swung divergently apart as they are separately transported leaving the sleeve in place on the container.

The containers 11 having sleeves 34 mounted temporarily thereon are then moved back into lineal alignment on the conveyor 14 for further transport to a heat-shrinking operation. Depending upon the selection of thermoplastic flexible film material for the tubular sleeve, the containers carrying the sleeves are passed through a tunnel oven (not shown) having a temperature ranging from about 170° to 500° F. The sleeves then rapidly shrink and conform to the container surface areas therebeneath in tightly-fitting arrangement.

The main turret of the machine is adapted to receive and handle containers at a wide variety of speeds of operation. At all speeds, the lugs on the conveyor surface and stationary arcuate side rails mounted thereon are capable of delivering the containers serially to a position in coaxial and co-radial alignment with the opened sleeves. The sleeve opening mechanism is adapted to delivering an individual sleeve in precise vertical alignment over an individual container at all such speeds in view of their central power source. The sleeve on each container may be further lowered if necessary or desired such as by a further tamping operation to place it in precise vertical alignment on the container body sidewalls.

Various modifications may be resorted to within the spirit and scope of the present invention as defined by the appended claims.

I claim:

1. Combined apparatus for assembling tubular shrinkable thermoplastic sleeves telescopically onto hollow containers comprising a rotary turret mounted on a vertical axle, a series of pairs of juxtaposed vacuum heads with confronting faces, first means for mounting each of said pairs of vacuum heads for independent vertical movement on said rotary turret, said pairs of vacuum heads being mounted on said turret in equi-spaced radial arrangement, second means mounting at least one member of each pair of said vacuum heads on said first mounting means for independent pivotal movement in a substantially horizontal plane and about a substantially vertical pin while maintaining the confronting face of each of said vacuum heads in a substantially vertical plane, conveyor means for moving said hollow containers in upright spaced-apart alignment through an arcuate substantially horizontal path coincidental with a portion of the orbital path of the vacuum heads on said turret, means for rotating said turret in timed relation with said conveyor means to thereby move said vacuum heads in a circumferential path of a constant radius, holding means for retaining a plurality of preformed tubular sleeves in flattened condition nested in a stack held radially and adjacent to said turret, means for serially removing the outermost sleeve from the stack and introducing same radially in substantially vertically disposed axial orientation with one open end lowermost into said circumferential path intermediate at least one pair of juxtaposed open vacuum members on said head to be engaged thereby, first stationary horizontal annular cam means, means connecting said first annular cam means to said second mounting means for serially horizontally pivoting said at least one member of each of said pairs of vacuum heads about its vertical pin towards the other member of each of said pairs of vacuum heads to grasp said interposed sleeve and for moving said one of said members of said pair of juxtaposed vacuum members positively away from said other member of said pair of vacuum members along said substantially horizontal plane while maintaining the faces of said heads in substantially vertical planes to fully open the tubular sleeve therebetween during each complete rotation of said rotary turret, second stationary annular cam means, and means connecting said second annular cam means to said first mounting means for serially moving each of said pairs of vacuum heads downwardly and upwardly during each complete rotation of said rotary turret to move each opened sleeve telescopically downwardly in coaxial alignment with an individual container conveyed on said conveyor means for its placement thereon and then withdraw each of said pairs of vacuum heads upwardly.

2. Combined apparatus in accordance with claim 1, wherein said means for moving said at least one member of said pair of vacuum members comprises means for horizontally moving both members of said pair of juxtaposed vacuum members together on said head to grasp said interposed sleeve and for moving both members of said pair of juxtaposed vacuum members positively apart along said substantially horizontal plane while maintaining the faces of said heads in substantially vertical planes to fully open the tubular sleeve therebetween.

3. Combined apparatus in accordance with claim 1, wherein said conveyor means comprises a horizontal belt conveyor having spaced-apart arcuate stationary guide rails mounted over one portion of the upper reach thereof adjacent and in alignment with said rotary turret.

4. Combined apparatus in accordance with claim 1, wherein said means for conveying said containers through an arcuate path comprises an arcuately-shaped pair of parallel stationary guide rails mounted beneath the orbital path of said pairs of vacuum heads.

5. Combined apparatus in accordance with claim 1, wherein said tubular sleeve is comprised of flexible thin polyvinyl chloride film which is flat-folded into an open-ended tubular preform.

6. Combined apparatus in accordance with claim 1, wherein said holding means for retaining said preformed tubular sleeves comprises a hollow holder having internal dimensions closely complemental to the folded sleeves with the plane of their axes aligned radially to said turret.

7. Combined apparatus in accordance with claim 2, wherein said means for serially removing the outermost sleeve from the stack comprises a second vacuum head, pair of feed rolls and substantially horizontal support means for delivering along a substantially horizontal path an individual sleeve vertically with the lowermost edge thereof supported on said support means to a juxtaposed pair of pivotally-mounted vacuum heads in timed relation thereto.

8. Combined apparatus in accordance with claim 2, wherein said rotary turret has a series of juxtaposed pivotally-aligned pairs of vacuum heads mounted thereon in equi-spaced radial alignment horizontally movable with one pair at each sleeve engaging and opening position.

9. Combined apparatus in accordance with claim 1, wherein said hollow containers consist of two-piece hollow bottles comprised of thermoplastic material and each juxtaposed pair of vacuum heads is adapted to place an individual slightly larger tubular sleeve therearound.

10. Combined apparatus in accordance with claim 1, wherein said means for conveying said containers through an arcuate path comprises a horizontal belt conveyor having spaced-apart lug members thereon and having an arcuately-shaped stationary pair of guide rails mounted thereover disposed beneath the orbital path of said vacuum heads on said rotary turret.

11. Combined apparatus in accordance with claim 1, wherein said means for serially removing the outermost sleeve from the stack comprises a second vacuum head, substantially horizontal support means and a vertically-aligned pair of contacting nip rolls for pulling an individual flattened sleeve from said second vacuum head for its vertical and radial movement through said rolls with its open ends vertically aligned and with the lowermost end thereof supported on said support means.

12. Combined apparatus in accordance with claim 1 wherein said means connecting said first stationary annular cam means to said second mounting means comprises a pair of vertically disposed members mounted on said rotary turret for pivotal movement about separate axes parallel to and spaced from said vertically disposed members, said axes being in an equi-spaced radial arrangement about and spaced from the axis of said rotary turret, each said vertically disposed member being associated with one of said pairs of vacuum heads and arranged to move each pair of vacuum heads towards and away from each other at any vertically disposed position of said first mounting means, and lever means connecting each of said vertically disposed members to said first stationary annular cam means to pivot the respective vertically disposed members and operate the associated pairs of said vacuum heads during rotation of said rotary turret.

13. Combined apparatus in accordance with claim 12 wherein said means connecting said second stationary annular cam means to said first mounting means comprises a substantially vertically disposed member secured to said first mounting means and connected to said second stationary annular cam means to move said first mounting means downwardly and upwardly during rotation of said rotary turret.

* * * * *